United States Patent [19]

Hamer et al.

[11] 4,441,060

[45] Apr. 3, 1984

[54] VIBRATORY CONVEYOR CONTROL ARRANGEMENT

[75] Inventors: Arthur Hamer, Oldham; Beverley H. Pardoe, Manchester, both of England

[73] Assignee: National Research Development Corporation, London, England

[21] Appl. No.: 244,795

[22] Filed: Mar. 17, 1981

[30] Foreign Application Priority Data

Mar. 19, 1980 [GB] United Kingdom ............... 8009177

[51] Int. Cl.³ ............................................. H02K 33/02
[52] U.S. Cl. ..................................... 318/114; 318/128; 318/127; 318/37; 198/763
[58] Field of Search ............... 198/766, 763, 761, 769; 318/114, 126–132, 37

[56] References Cited

U.S. PATENT DOCUMENTS 3,372,793  3/1968  Redford et al. ............... 198/763
3,748,553  7/1973  Reiner .......................... 318/128
4,354,618  10/1982 Weyandt ....................... 318/130

Primary Examiner—J. V. Truhe
Assistant Examiner—Arthur G. Evans
Attorney, Agent, or Firm—Oblon, Fisher, Spivak, McClelland & Maier

[57] ABSTRACT

A control arrangement for vibratory conveyors, including bowl and linear types, in which the vibration frequency is set by the behavior of the conveyor and not by an applied frequency. A sensor, SC, senses the behavior of the conveyor and a frequency, of controlled amplitude and phase, is derived from the sensor output to energize conveyor drive means, AV and AH1 to AH3. User controls (HA, VA, PA) for amplitude and phase can be mark/space adjusters (HMS, VMS, DMS) effective on the base circuits of transistors connected to electromagnetic actuators. Low voltage operation (less than 50v) is provided without proportionally increased current, partly by energy recovery from the inductors in the actuators. Two levels of protection against supply ripple are included (RT, RLA) and the actuator drive can be stabilized against supply variation (MSC). The low-voltage operation provided is both safer and more efficient than mains voltage operation.

15 Claims, 5 Drawing Figures

VIBRATORY CONVEYOR CONTROL ARRANGEMENT

FIELD OF THE INVENTION

This invention relates to conveyors and more particularly to control arrangements for such conveyors.

DESCRIPTION OF THE PRIOR ART

Conveyors are known, e.g. UKPS No. 1154042 and U.S. Pat. No. 3,372,793 containing a similar disclosure, and UK Patent Publication No. 2030731/A, in which the relative phase of energizing forces applied for substantially orthogonal, usually vertical and horizontal, vibration of the conveyor load supporting means is variable. As specifically described in the above documents one form of energization is by means of electromagnetic actuators acting between a support and bowl mounted on the support by torsion bar elements, some elements for horizontal movement and some for vertical movement. The actuators, when energized with alternating electrical power, displace laminated parts on the bowl against the torsion springs.

As described in the above documents the energization is controllable in amplitude and phase to achieve variation in the conveying speed. The energization is at a relatively high voltage, i.e. some hundreds of volts, and moderate current, i.e. some tens of milliamps, which is derived from the output of an amplifier whose input is an oscillation of appropriate frequency, amplitude and phase. These parameters are set by use of at least five user-adjusted controls which require a setting up procedure which has to be specifically devised and carefully followed for different loads. It is suggested in the last of the above documents that the actuator coils may be energised with a low voltage. Conveniently the set frequency of the alternating supply mains is used.

SUMMARY OF THE INVENTION

It is an object of the invention to provide a conveyor control arrangement with simpler controls and setting up procedure.

According to the invention there is provided a vibratory conveyor control arrangement for a vibratory conveyor of the type comprising a base, a load-supporting surface defining a load-path, resilient mounting means between the base and the surface to permit vibration of the surface substantially along and normal to said path together with respective first and second driving means energizable to bring about said vibration, the control arrangement including in a closed control loop means to generate a motion signal from the vibrational motion of the surface which signal represents at least a component of said motion and means responsive to said motion signal to control the energizations of said driving means to maintain said vibration.

According to another aspect of the invention, there is provided a vibratory conveyor of the type described above and including a control arrangement as described in the preceding paragraph.

Conveniently the control arrangement includes means to apply a start signal to the closed loop to initially energize said driving means to initially move said surface and generate a motion signal.

The means to apply a start signal may be an external control. The means to apply a start signal may be an electronic circuit of said arrangement.

The control arrangement may operate to determine the frequency of motion of the surface without reference to any electrical frequency source.

Preferably the control arrangement includes user operable means to adjust the amplitude of the energization of at least one of said driving means and thereby the amplitude of the vibration of the surface. Desirably the control arrangement includes user operable means to adjust the phase shift included in at least a branch of the control loop whereby the phase relation of the driving means can be adjusted.

According to a further aspect of the invention there is provided a vibratory conveyor control arrangement for a vibratory conveyor of a load-supporting surface defining a load-path and including resilient mounting means permitting vibration of the surface substantially along and normal to said path and respective first and second electrical driving means to bring about said vibrations, the control arrangement means being responsive to bowl motion to produce a bowl motion signal, a control circuit means having a signal input, user controls and driving means energization outputs, the circuit supplying in operation the energizing outputs in a manner determined by the control circuit with reference to the signal representing bowl motion and the settings of the user controls, the control circuit including a start control and means responsive to the operation of the start control to determine the energisation for a particular load in accordance with user controls setting only vibration amplitudes substantially along and normal to said path and the relative phase of said vibrations.

According to a particular aspect of the invention the control arrangement operates at a low voltage (less than 50 v) and the driving means are energized at such a low voltage. The control arrangement operated at low voltage permits more efficient energization of the driving means reducing the electrical power consumed for driving a given load.

Advantageously such driving means is a transistor-inductor circuit, the inductor being part at least of an electromagnetic actuator effective between the base and support surface, the transistor permitting and opposing the flow of current through a connected inductor from a supply in dependence on a control signal input and the circuit including energy recovery means effective on the opposition to current flow by said tansistor to permit energy from the inductor to return to the supply.

BRIEF DESCRIPTION OF THE DRAWINGS

Embodiments of the invention will now be described with reference to the accompanying drawings in which.

Bowl feeders are well known in the art and will not be described in detail. The type appropriate for the control arrangement in FIG. 1 has a circular bowl, with an inclined peripheral track, supported on a base by resilient means for vibration by three horizontal actuator elements and one vertical actuator element. A sensing coil provides a horizontal bowl motion signal.

Clearly other actuator and sensing arrangements can be made with appropriate changes readily apparent to those skilled in the art.

Figure 4:
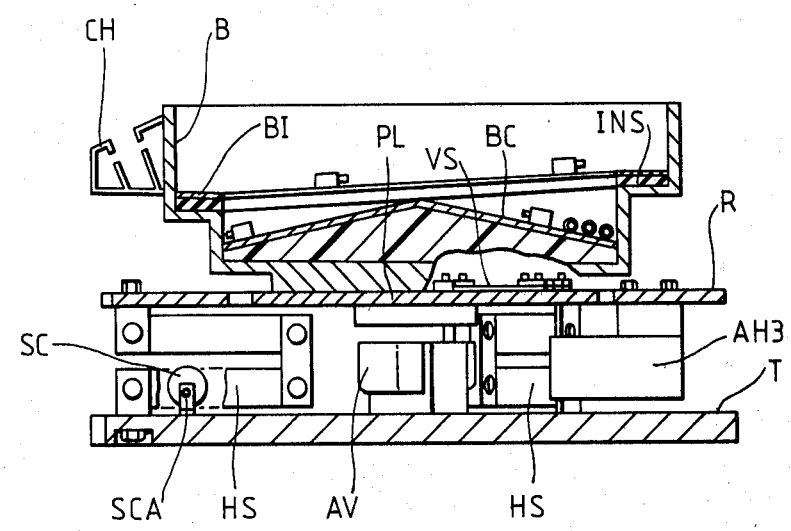
FIG. 4 shows in cross-section one form of bowl feeder construction to which the controller in FIG. 1 is applicable.

A typical exemplary construction of this type of feeder is show in FIG. 4 although clearly this is not the only type of conveyor to which the invention can be applied. Linear vibratory conveyors are among the types to which the invention is applicable. As shown in the FIG. 4 cross-section the conveyor is mounted upon a substantial base formed by a table T which may be a stiff steel sheet. A strong steel ring R is resiliently supported from the table T by three horizontal suspension units HS (only two shown) and the ring R in turn supports a further stiff steel plate PL by three vertical suspension units VS (only one shown). The circular conveyor bowl B is attached to plate PL for movement with it. The horizontal and vertical suspension units are generally similar, being of U-form with each limb a spring, eg of metal strip, the limbs joined to form the "U" by a stiff bar. The free ends of the limbs are secured to the conveyor parts to be suspended. The strength and stiffness of the springs is selected according to the form of the conveyor and load, as is known in the art. The horizontal and vertical suspension units are conveniently equally spaced around the circular conveyor. Suitable drive means for the conveyor are also provided. In the example these are electromagnetic actuators having a stack of E-laminations carrying a coil on the centre limb and a co-operative stack of I-laminations adjacent the ends of the E-limbs. The E-laminations are attached to table T and the I-laminations to the ring R for the horizontal actuators (AH1 to AH3), as indicated at AH3, and to the plate PL for the vertical actuator AV. Conveniently there are three horizontal actuators, which may be inclined in known manner, and one vertical actuator. Other forms and numbers of actuators may of course be used. The bowl B has a central bowl cone BC onto which parts to be conveyed are loaded. These parts are moved onto and up incline BI by the controlled motion of the bowl. The incline, and cone may be supported on acoustic insulation INS. A channel CH conveys the parts from the incline for utilisation.

The conveyor is provided with sensing coil CS, conveniently mounted on table T and a search coil armature SCA mounted on ring R. The search coil is thus able to produce an electrical signal which represents the motion of ring R, by the relative movement of the armature SCA and coil SC with the horizontal vibration of ring R.

Figure 1:
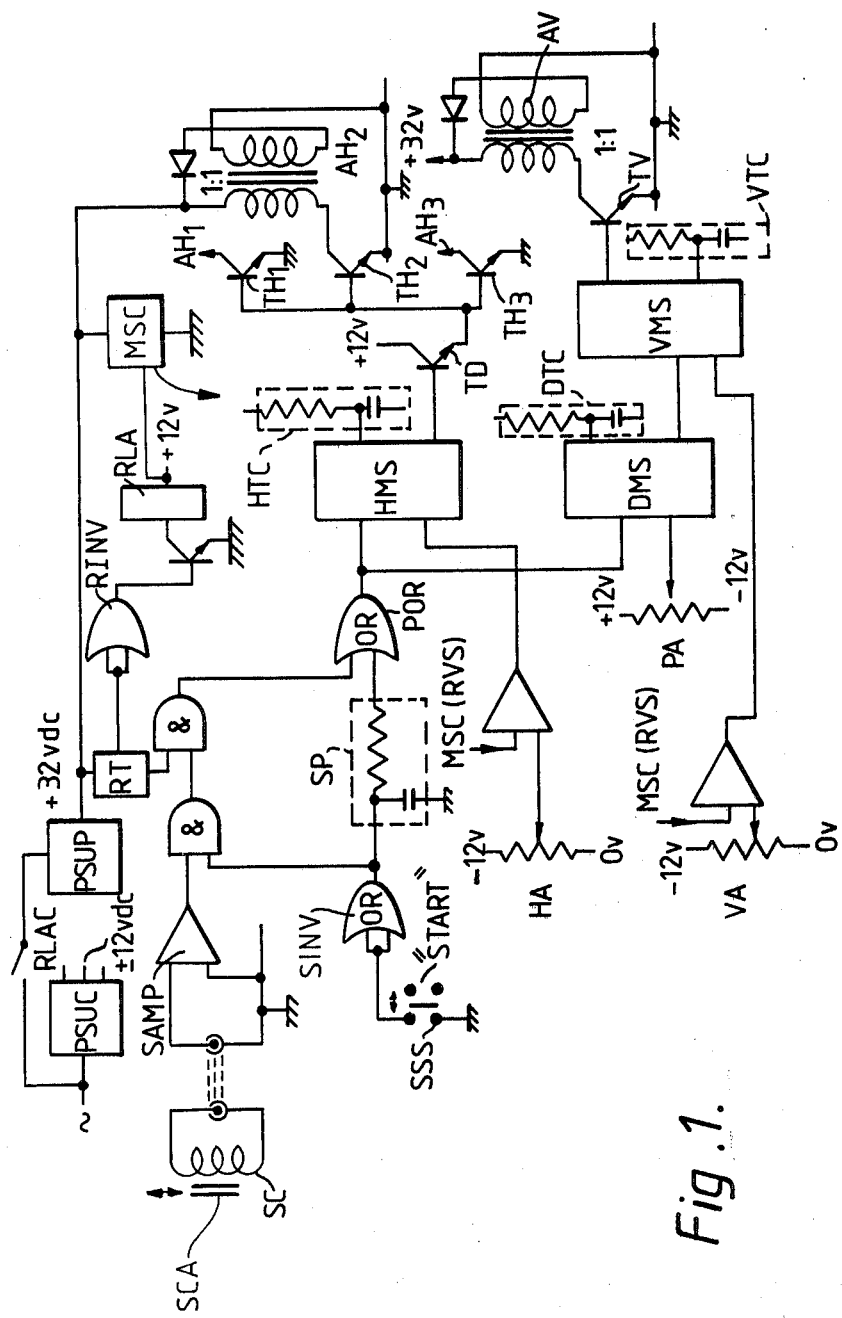
FIG. 1 is an outline block schematic diagram of a bowl feeder controller embodying the invention.

FIG. 1 is an outline block schematic diagram of a control arrangement for a bowl feeder embodying the invention. In all the circuit diagrams some details such as power connections and component values, have been omitted for clarity where these are readily apparent to those skilled in the art.

Referring now to FIG. 1 the actuator elements are energised from a 32 v dc supply from a mains-energised power supply unit PSUP. The input to unit PSUP is via a relay contact RLAC. A further power supply PSUC (not shown) provides stabilized power for the integrated circuit and discrete semiconductor devices at ±12 v dc.

The circuit of FIG. 1 will be briefly described starting from the output where the actuators are connected.

The vertical actuator, AV, and the three horizontal actuators, $AH_1$, $AH_2$, and $AH_3$, are each transformer wound stacks of E and I-laminations. The transformer primaries are the collector loads of suitable output transistors, TV and $TH_1$, $TH_2$, $TH_3$ respectively and the secondaries are diode-coupled to the 32 v dc supply. This coupling will be described in detail later. The three horizontal output tansistors have a common driver transistor TD to provide a load appropriate for an integrated circuit which is also the type of load provided by the single vertical output transistor TV. The horizontal and vertical output circuits are activated by respective integrated circuit monostables HMS and VMS which provide pulses to the respective transistors. The pulses are of controlled length and repetition frequency, over the range of some 25 Hz to 50 $Hz_1$ in this embodiment. The length of the pulses is controlled by dc control signals from respective horizontal and vertical amplitude user-operated controls HA and VA. These controls are potential dividers across the $-12$ v supply which provide an input for respective integrated circuit differential amplifiers, also each have an input MSC derived from the value of the 32 v dc supply to provide compensation for mains supply voltage variation. The timing of the occurrence of each pulse is set by an output signal from an OR gate POR. The signal from gate POR to the monostable VMS is delayed with respect to that to monostable HMS by a delay monostable DMS. The delay introduced by monostable DMS is controlled by a user control potential divider PA on one input of monostable DMS.

The output from gate POR is normally derived from the bowl motion signal. Initially however an input pulse for gate POR is generated by the start and run condition of start/stop switch SSS via inverter SINV and RC network SP. This pulse causes the eventual energization of the actuators to provide bowl motion which is sensed by the sensing coil SC. The output of the sensing coil SC is applied via an integrated circuit amplifier and AND gates to an input of gate POR as an edge representing the bowl excursion in the horizontal sense. This provides a control loop directly for the horizontal excursion and indirectly, via the delay DMS, for the vertical excursion. The integrated circuit amplifier SAMP smooths and shapes the motion signal. The first AND gate, SAND, is only enabled when the switch SSS is in the start and run position. The second AND gate, RAND, is disabled if the 32 v dc ripple is excessive. If the 32 v dc ripple is even higher the relay RLS of contact RLAC (above) is operated to cut off the 32 v dc supply at the mains. This provides protection for the actuators.

In this way the vibration frequency can be the natural frequency of the vibration sensed by the sensing coal SC. In the embodiment the horizontal vibration is sensed, but clearly other directions could be used and, with suitable selection or mixing, a combination of directions. So long as the amplification around the control loop provides enough drive power to meet losses and a suitable phase shift occurs, usually 180°, vibration is maintained.

Figure 2A:
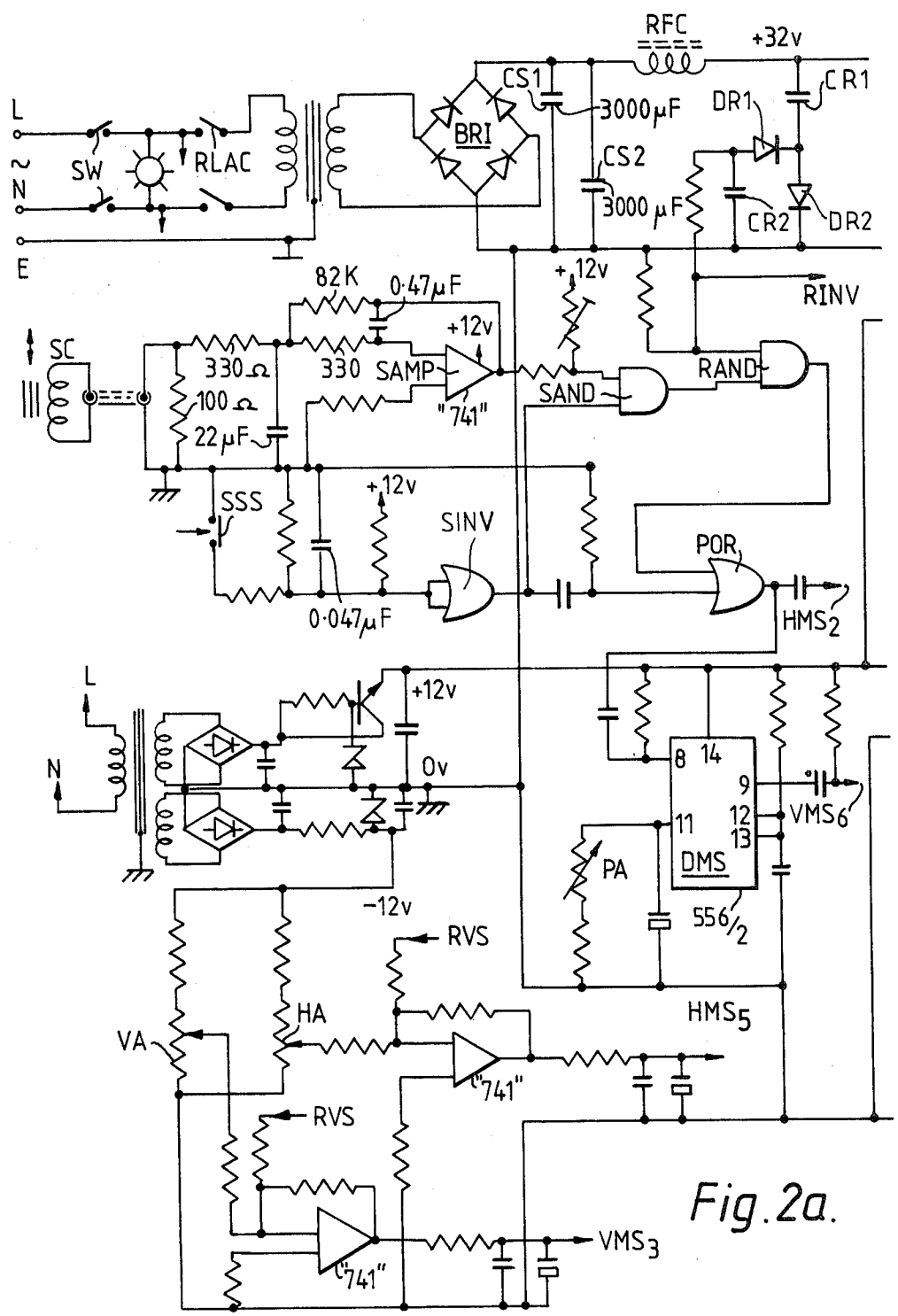
FIGS. 2a to 2b are, together, a detailed circuit of the controller in FIG. 1
Figure 2B:
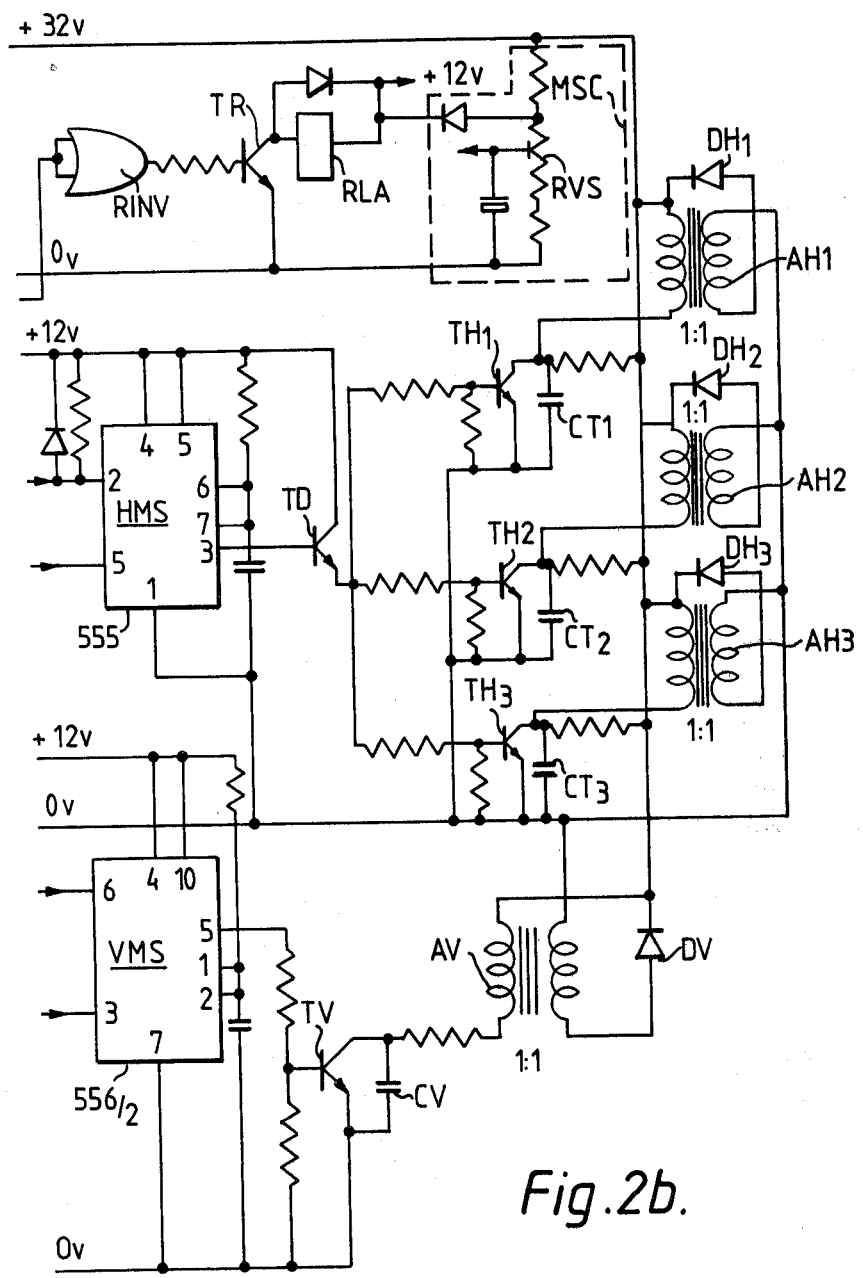

Reference is now directed to FIGS. 2a and 2b which are, together, a detailed circuit diagram of one form of the block schematic in FIG. 1. While much of the circuit is based on standard design techniques for integrated circuit devices and will not be considered in detail, those parts which provide significant advances in the control of bowl feeders and their reliable and economic operation will be considered.

In the arrangement in FIGS. 1 and 2 the bowl actuators are energised from a 32 v supply. This is distinct from known bowl actuators which use a significantly higher, say ten times, supply voltage. While the possibility of 24 v supply has been mentioned in UK. Patent Publication No. 20,330,731/A, inventors Hamer, Pardoe and Redford, no details were given of any way of implementing such a supply arrangement.

The implementation of this proposal by the present inventors, Hamer and Pardoe, has resulted in techniques for low voltage actuators which, while achieving the expected operation at a safer voltage, have produced a surprising improvement in performance and a reduction in consumption of energy compared with the high voltage forms. These improvements, by using the power fed to the bowl more efficiently, also reduce heat, noise and vibration caused by the actuator drive power which was hitherto not coupled into the bowl and its load and could only be dissipated in this way. Thus the expected increase in current at lower operating voltages, with inevitable cost and other penalties, has been avoided.

The 32 v dc supply is rectified and smoothed 24 v ac supplied by unit PSUP. A bridge rectifier BRI and capacitor smoothing, CS1, CS2, are adequate to produce a tolerable ripple level on the nominal dc value of 32 v. A radio frequency choke, RFC, may also be used to exclude mains borne electrical noise particularly in factory environments.

Each actuator is a stack of E laminations with the central limb carrying a coil on a former. The I-lamination stack is attached to the bowl for co-operation with the ends of the E stack on the bowl support plate. Desirably the opposing faces of the air gaps between the E and I stacks, on at least one of them, are modified from the normal plane form. For example by cutting short the limbs of say half the E laminations and narrowing say half the I laminations and assembling each stack in layers of several cut then uncut laminations a castellated form of opposing faces is produced. By matching the peaks of each face the area for flux flow through the air gaps is reduced, to about half in one case, while the total flux value is not altered. As the force is proportional to the square of the flux value and inversely proportional to area the effective actuator force is approximately doubled. Saturation of the castellations, if it occurs, is not a serious drawback. The coil on each former is double wound in 1:1 ratio. Measures to reduce the mutual inductance and capacitance of the coils may be helpful as will be explained below, with reference to capacitors $CT_1$, $CT_2$, $CT_3$ and CV.

The operation of a typical actuator drive circuit is now described, for example that using transistor TH2, one of the horizontal circuits. The pulse output of monostable HMS is fed through drive transistor TD, an emitter follower stage, to the base of transistor TH2. This transistor, TH2, is switched between the conducting and non-conducting states in dependence on the pulse condition and respectively permits or opposes current flow in its collector circuit, of a resistor in parallel with the primary winding of the actuator coil connected to a 32 v dc supply. A small capacitor CT2 is connected between the collector and the other (−ve) supply terminal. The secondary winding of the actuator is connected at one end to the negative supply terminal and at the other via a diode, $DH_2$, to the 32 v dc supply terminal. The secondary winding is connected to the 32 v terminal in the opposite sense from the primary winding.

This connection provides a significant improvement in the efficiency of the drive arrangement so that despite the reduction in voltage the inevitable increase in current is less than that for a simple adjustment of the high voltage circuit components from a high to low voltage values. Also the operating conditions of the transistor are less arduous.

The behaviour on the switching on of the transistor is as follows. The capacitor $CT_2$ is discharged by the conducting transistor, which is preferably saturated, and current flows in the primary winding. The secondary is effectively open circuited at this time so the primary current produces a flux in the laminated actuator E-core attracting the I-core and bowl to move it in the horizontal sense. On the transistor base being shifted towards 0 v the transistor changes from conducting to a non-conducting condition and the number of charge carriers in circulation begins to fall. The consequent cessation of primary current from the supply is effective by mutual induction to produce a high voltage in the open circuit primary of a sense to cause diode $DH_2$ to conduct and a current to flow into smoothing capacitors $CS_1$, $CS_2$. This current is derived from the energy from the supply stored in the actuator magnetic circuit and is thus returned to the supply instead of being dissipated in heat in the windings or noise and vibration. The vibration resulting from the actuator energization in this manner is about a rest position rather than unidirectionally from a rest position as hitherto. This also increases the efficiency of the drive by increasing the amplitude of bowl vibration for a given energy supply.

The return of energy to the supply also reduces the stress on the drive transistor. While the transition from "off" to "on" is straightforward the reverse transition is more complex. The transistor can not return immediately to the non-conducting state in view of the finite lifetime of current carriers produced in the "on" condition. The transistor must therefore support both current and voltage at significant values instead of only oe or the other. This can cause excess dissipation and thermal destruction or even a sudden break down due to a rapid increase in current beyond the safe level as stored energy flows in an attempt to resist the switch-off. This danger can be further reduced by capacitor $CT_2$. This capacitor is discharged while the transistor $TH_2$ is switched on and at switch off is able to charge from the energy in the inductor of actuator $AH_2$. This action controls the current in the transistor circuit to safe limits during switch-off. Typical values for the capacitors $CT_2$ and $CS_1$ and $CS_2$ are shown in the diagrams.

A further benefit is that there is not any standing dc current in the inductor to increase the heat produced as well as the energy wasted. Thus instead of the actuator current varying up and down from a set value the current is reduced to zero in each pulse period.

Turning now to the circuit region associated with relay RLA and AND gate RAND. A signal representing the +32 v dc line ripple is derived via a capacitor $CR_1$ and two diodes $DR_1$ $DR_2$. Capacitor $CR_2$ is charged by the current from this signal. The potential on capacitor $CR_2$ represents ripple amplitude and supplies are input of AND gate RAND. When a selected potential representing an undue ripple level is achieved the AND gate is disabled inhibiting the drive to the bowl. When the ripple level rises beyond the represented level the increased potential on capacitor $CR_2$ is further effective, via inverter RINV, to drive transistor TR to cause relay RLA to open contacts RLAC to cut off the supply to the power supply PSUP for the 32 v dc supply. This two-stage protection is able to firstly protect the actuators from damage and secondly prevent excessive vibration in the bowl motion. Relay RLA is energized from the 12 v supply.

To reduce the effect of variation in the supply mains voltage a further signal is derived from the +32 v dc supply which indicates its actual value.

A potential divider including a preset adjustable element RVS supplies a dc voltage level MSC to an input of both the horizontal i.c. amplifier HDA and the vertical i.c. amplifier VDA. These inputs adjust the effect of the user controls HA and VA so that the actual mark/space ratio of the pulse output of the monostables HMS and VMS is adjusted automatically to compensate for mains supply voltage variation or others affecting the 32 v supply and maintain a substantially constant bowl motion in accordance with the user control settings.

The action of the part of the circuit processing the signal from the sensing coil SC on the bowl feeder has been briefly referred to above. The components associated with the i.c. amplifier SAMP result in an amplifier output which is a smoothed and filtered output form of the coil signal which also has a defined edge at intervals in time representing cycles of the bowl motion. These edges are also shifted 90° in phase from the frequency at which the bowl is vibrating. This phase shift, together with a further 90° phase shift around the loop through the controller and the horizontal actuator provides the condition for maintainence of the vibration in the horizontal sense.

The occurrence of the edge at the output of gate POR provides a time reference from which the vertical vibration can be adjusted in phase with respect to the horizontal vibration, by user control PA. In FIG. 2 this is a variable resistor connected between a control terminal of an i.c. monostable DMS of the "556" type and supply zero. The action of monostable DMS is to delay the application of the edge derived from the horizontal excitation to a selected point in the horizontal vibration.

The power supply unit PSUC is conventional. The more heavily loaded +12 v dc line is stabilized by a transistor regulator while the less heavily loaded −12 v dc line is stabilized only by a zener diode. A switch SW controls the mains supply to both power supply units.

The operation of the controller is as follows, starting from the condition of an empty bowl and the requirement to feed components of a fresh type from the bowl. Switches SW and SSS, of course, are "off".

Conveniently the amplitude controls HA, VA are set to a low level and the phase control PA to mid-point but these initial settings are not essential. A few of the components are placed in the bowl and switches SW and then SSS switched to "on" and "start" respectively. First the horizontal amplitude control is adjusted to increase the vibration amplitude to near the maximum and then the vertical amplitude control is similarly adjusted. The phase control is then adjusted for the required feed rate. Components are added to the bowl as required. The simplicity of these adjustments is to be compared with that of earlier electrical controllers in which many more adjustments had to be carried out and in a strict order on those feeders in which no adjustment was possible except by altering the mechanical suspension of the bowl cf. U.S. Pat. No. 3,915,292 (UK Pat. No. 1,462,152). The adjustment given above may be changed during use to adjust the bowl feed rate. The settings for a component noted from a previous operation can usually be set up and the controller switched on to bring about correct feeding at once. It is not even necessary to switch the start switch to "off" before switching on the main switch SW as the controller can tolerate this on-load start-up condition.

Figure 3:
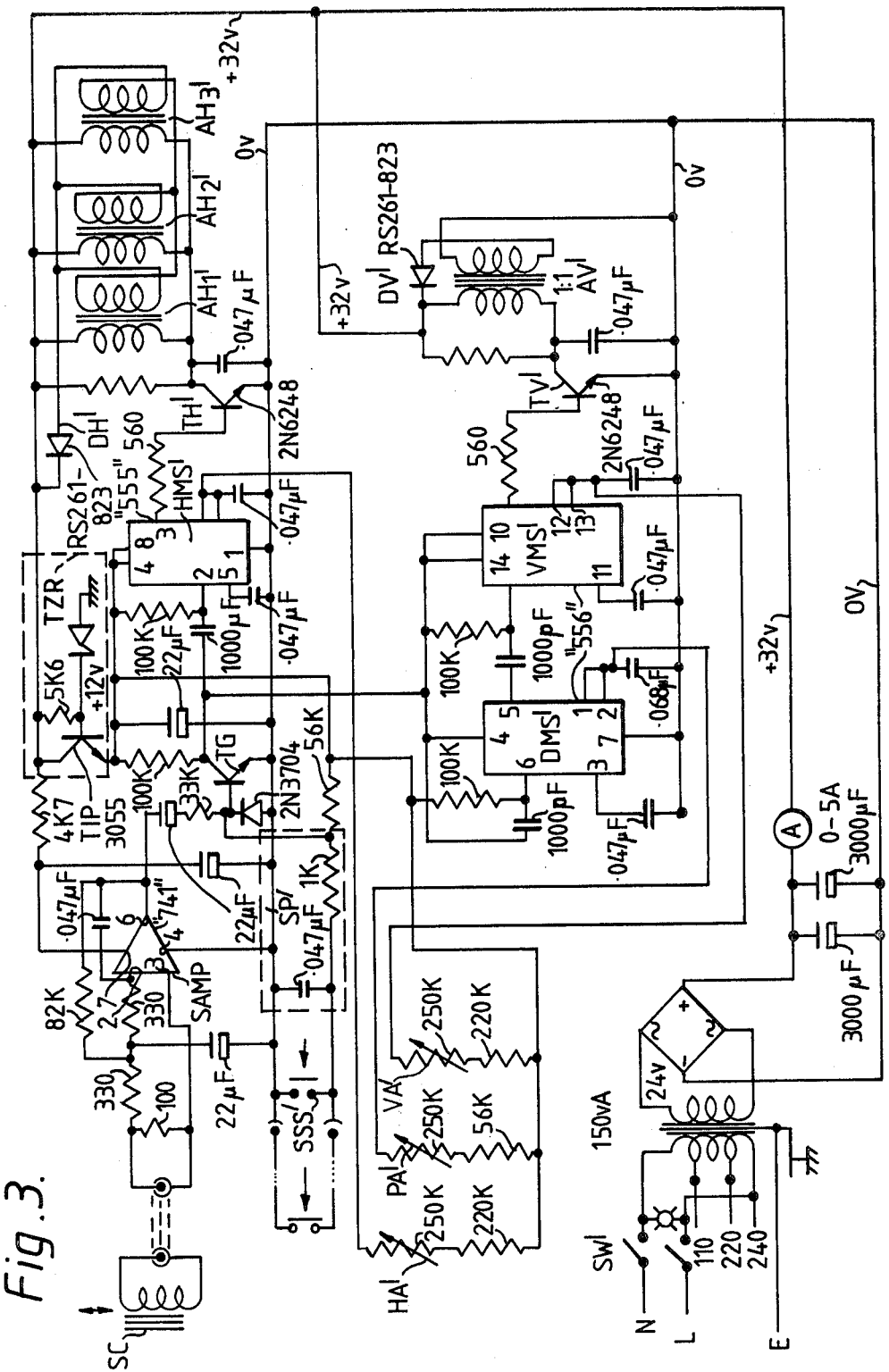
FIG. 3 is circuit diagram of another controller embodying the invention.

FIG. 3 shows another embodiment of a controller according to the invention. This is a version of that in FIG. 2 which, while simplified, achieves the same overall result and economises on components. Elements shown in FIGS. 1 and 2 are indicated in FIG. 3 by the same reference with an added prime, thus DMS becomes DMS'.

Significant changes are the omission of the i.c. amplifiers associated with the user controls and the supply of the +12 v dc rail from the +32 v dc rail with a transistor/zener diode regulator TZR. A −12 v dc rail is not used. The various logic circuit elements, SAND, RAND and POR are reduced to a single discrete transistor gate TG. On the operation of switch SSS' to start vibration the charging current for the capacitor of the start pulse circuit SP' passes to the horizontal and vertical monostables and starts vibration of the bowl as described above, the bowl motion signal is processed in i.c. amplifier SAMP' as before.

A most important change is in the actuator drive circuits. A single transistor TH' replaces the four transistors TD, TH$_1$, TH$_2$, TH$_3$ used for FIG. 2. A single diode, DH', can also thus replace the three diodes DH$_1$, DH$_2$, DH$_3$. Conveniently the diodes DH', DV' can be installed on the bowl near the actuator coils. This reduces the number of connections between the controller and the bowl and avoids the possibility of poor contacts interfering with the action of the diodes. The energy recovery and power limitation circuits are as described above.

The controller operated at a low voltage (nominal 24 v (ac) level) has shown a surprising improvement in performance when compared with the high voltage types (c 250–300 v) used hitherto. This improvement is in addition to the economy in power and reduced heating and noise. The actuators are effective to provide a significant increase in vibration amplitude and thence in component feed. At a typical bowl resonance frequency of around 30 Hz the high voltage types vibrated about ⅛" (3 mm) pk-pk and gave a feed rate of up to 4" (10 cm)/second. The low voltage types resonated more precisely (at, say, 3 Hz) with twice the amplitude, i.e. up to ¼" (6 mm) pd-pd, giving a feed rate approaching 8" (20 cm)/second. This was for a power consumption with a maximum value of 150 VA and generally much less. Typically the vertical vibration is driven at above the resonant frequency, 12% being a suitable margin. These figures relate to a bowl of some 18" (45 cm) diameter.

The controllers described above thus provide, in addition to the expected safety feature of low voltage operation, an unexpected improvement in power economy and a most significant increase in feed rate which permits a similar increase in production rate of machines fed from the bowl conveyor. Furthermore the operation of the controller is now much simpler for the user and the circuit can be protected and stabilised against malfunction and supply variations if this is desirable. The operating frequency is now appropriate to the equipment characteristics, instead of the equipment being at best a near approximation as is the present case. Thus currently available equipment has mechanical suspension which varies within usual manufacturing tolerances and is set up individually for each item. The techniques now disclosed permit each item to be operated at an optimum state without time consuming adjustments before or after manufacture.

While the invention has been described in terms of a specific bowl conveyor form and for specific supply voltages and components clearly the invention is applicable to other techniques of vibratory conveyor construction eg. the linear type, and controller circuit design.

We claim:

1. A vibratory conveyor control arrangement for a vibratory conveyor of the type comprising a base, a load-supporting surface defining a load path, resilient mounting means between the base and the surface to permit vibration of the surface substantially along and normal to said path together with respective first and second driving means energizable to bring about said vibration, the control arrangement including in a closed control loop means to generate a motion signal from the vibrational motion of the surface which signal represents at least a component of said motion and means responsive to said motion signal to control the energization of said driving means to maintain said vibration, the driving means including at least one electromagnetic actuator and an electrical power supply therefor together with means to recover energy from the actuator to the supply on cyclic energization of the actuator to bring about said vibration.

2. A control arrangement according to claim 1 including means to apply a start signal to the closed loop to initially energize said driving means to initially move said surface and generate a motion signal.

3. A control arrangement according to claim 2 in which the means to apply a start signal is an external control.

4. A control arrangement according to claim 1 which is effective in operation to determine the frequency of motion of the surface without reference to any electrical frequency source.

5. A control arrangement according to claim 1 which includes user operable means to adjust the amplitude of the energization of at least one of said driving means and thereby the amplitude of the vibration of the surface.

6. A control arrangement according to claim 1 which includes user operable means to adjust a phase shift included in at least a branch of the control loop whereby the phase relation of the driving means can be adjusted.

7. A control arrangement according to claim 1 in which a said driving means includes a transistor-inductor circuit, the inductor being part at least of an electromagnetic actuator effective between the base and support surface, the transistor to permit and oppose the flow of current through connected said inductor from a supply in dependence on a control signal input and the circuit including energy recovery means effective on said opposition to current flow by said transistor to permit energy from the inductor to return to the supply.

8. A control arrangement according to claim 7 in which the supply is at a low voltage (less than 50 v).

9. A control arrangement according to claim 7 including means to inhibit the drive of the conveyor when a selected ripple level is exceeded in a nominally dc supply to the driving means.

10. A control arrangement according to claim 7 including means to cut-off a nominally dc supply to the drive means when an excessive ripple level is present in the supply.

11. A control arrangement according to claim 7 including means responsive to an actual value of said supply to adjust the operation of the drive means to compensate for variation of the actual value from a nominal value.

12. A control arrangement according to claim 11 in which the adjustment is achieved by varying the mark/space ratio of a control signal.

13. A vibratory conveyor including a base, a load-supporting surface defining a load-path, resilient mounting means between the base and the surface to permit vibrations of the surface substantially along and normal to said path together with respective first and second driving means respectively energizable to bring about said vibrations and a control arrangement including in a closed control loop means to generate at least one motion signal from the vibrational motion of the surface each which signal represents an individual frequency component of said motion and means responsive to a said motion signal to control the frequency of energization of said driving means to maintain said vibration in a respective direction together with means independent of the control of frequency of energization to control the degree of energization.

14. A vibratory conveyor control arrangement for a vibratory conveyor of a load-supporting surface defining a load-path and including resilient mounting means permitting vibration of the surface substantially along and normal to said path and respective first and second electrical driving means to bring about said vibrations, the control arrangement including means responsive to the motion of the load supporting surface to produce a motion signal, a control circuit means having a motion signal input, user controls, driving means and energization outputs, means responsive to the motion signal input to produce a first time reference signal edge repeated at intervals in time representing cycles of the conveyor motion along said path and means to produce from the first signal a further signal adjustable in phase from the first signal, means respectively responsive to the first and further signals to produce driving means energization pulses at said outputs at respective times and of independent durations set by said user controls to determine vibration amplitude, the circuit supplying in operation the energizing outputs in a manner determined by the control circuit with reference to the signal representing motion and the settings of the user controls, the control circuit including a start control and means responsive to the operation of the start control to determine the energization for a particular load in accordance with user controls setting only vibration amplitudes substantially along and normal to said path and the relative phase of said vibrations.

15. A vibratory conveyor according to claim 13 in which the load-supporting surface is a bowl.

* * * * *